United States Patent [19]

Matsuura et al.

[11] Patent Number: 5,081,403
[45] Date of Patent: Jan. 14, 1992

[54] ERROR DETECTING UNIT OF MOTOR ROTATION CONTROL DEVICE

[75] Inventors: Yasumasa Matsuura, Hyogo; Hiroyuki Harada, Osaka; Kajitani Tetsuji; Toshihiko Araki, both of Hyogo, all of Japan

[73] Assignee: Mita Industrial Co., Ltd., Osaka, Japan

[21] Appl. No.: 602,725

[22] Filed: Oct. 24, 1990

[30] Foreign Application Priority Data

Oct. 31, 1989 [JP] Japan ................. 61-285524

[51] Int. Cl.⁵ .................................................. H02P 3/00
[52] U.S. Cl. ...................................... 318/280; 318/362
[58] Field of Search ........................... 318/280–286, 318/265, 272, 275, 258, 364, 362, 453, 457, 461, 466, 478, 489, 254, 757–761, 138, 632, 254

[56] References Cited

U.S. PATENT DOCUMENTS

| | | | |
|---|---|---|---|
| 4,258,299 | 3/1981 | Takeda et al. | 318/254 X |
| 4,475,073 | 10/1984 | Hawkins | 318/609 |
| 4,563,621 | 1/1986 | Moore | 318/257 X |
| 4,622,500 | 11/1986 | Budelman, Jr. | 318/599 X |
| 4,763,057 | 8/1988 | Danz et al. | 318/809 |
| 4,897,882 | 1/1990 | Pickering | 318/284 X |
| 4,961,042 | 10/1990 | Imaseki | 318/758 |

Primary Examiner—William M. Shoop, Jr.
Assistant Examiner—A. Jonathan Wysocki
Attorney, Agent, or Firm—Koda and Androlia

[57] ABSTRACT

A motor rotation control device furnished with a rotational detector for detecting the rotation of the motor and actual rotation direction detecting means for obtaining the actual direction of rotation of the corresponding motor on the basis of the rotation detection signals of the corresponding rotational detector and so composed that reverse drive force can be given to the corresponding motor by changing a commanding signal for appointing the direction of rotation of the corresponding motor when changing the direction of rotation of the corresponding motor or braking the motor, wherein any error of the motor rotation control device can be instantaneously detected, without waiting until the above actual direction of rotation of the motor becomes coincident with the rotation commanded direction after changeover, even right after the rotation commanded direction of motor by a commanding signal has been changed.

2 Claims, 5 Drawing Sheets 5,081,403

ERROR DETECTING UNIT OF MOTOR ROTATION CONTROL DEVICE

BACKGROUND OF THE INVENTION

1. Field of the Invention

The present invention relates to the improvement of an error detecting unit of a motor rotation control device, and more particular to an error detecting unit of a motor rotation control device of which error can be instantaneously detected.

2. Description of the Prior Art

Generally, a motor rotation control device is provided with a rotational detector such as an encoder attached to the motor.

The rotational detector outputs two kinds of rotation detection signals (A, B) having a phase difference (for instance 90 degrees) and the equal frequency according to the rotation of motor.

The time charts in FIG. 4 and FIG. 5 show an example of the rotation detection signals A ($\phi$A) and B ($\phi$B), and the time charts show the conditions of the rotation detection signals when the motor rotates counterclockwise (hereinafter called "CCW direction") and rotates clockwise (hereinafter called "CW direction"), respectively.

This motor rotation control device outputs a commanding signal for appointing the direction of rotation of the motor to make the motor rotate, and the actual direction (CCW direction or CW direction) of rotation of the motor is obtained according to difference of the level (low level or high level) of the rotation detection signal B on the upstroke of the rotation detection signal A (the time (j) and (k) in FIG. 4, the time (l) and (m) in FIG. 5), thereby causing the motor to be driven and controlled.

In usual driving of the motor, the rotation commanded direction of the motor is coincident with the actual direction of rotation thereof.

However, according to such a motor rotation control device as shown in the above, reverse drive force is given to the motor by changing the rotation commanded direction when changing the direction of rotation of the motor or braking the motor, thereby the motor rotation can not be reversed instantaneously from the current actual direction of rotation thereof. Therefore, when changing the direction of rotation or braking, the rotation commanded direction of the motor is compelled to be opposite to the actual direction of rotation thereof.

For example, the ensuing description copes with the case of changing the direction of rotation of the motor by utilizing the time chart in FIG. 6. In the case that the rotation commanded direction of the motor is changed to the CW direction (the time (g)) when the motor rotates in the CCW direction (the period of time (f) through (g)), reverse drive force is given to the motor and the motor is speed-decelerated (the period of time (g) through (h)). After that, the actual direction of rotation of the motor is changed from the CCW direction to the CW direction (the period of time including and after (h)).

Therefore, in the above period of time (g) through (h), the actual direction of rotation of the motor becomes opposite to the rotation commanded direction.

On the other hand, as shown with a dashed line X in FIG. 6, the period of time during which the actual direction of rotation of the motor becomes opposite to the rotation commanded direction is the period of time (g) through (i) in braking the motor as well as in the case of changing the direction of rotation.

A method for judging that the motor rotation control device is out of order when the rotation commanded direction of the motor is not coincident with the actual direction at other time than in changing the direction of rotation or braking the motor as shown in the above has been usually utilized as a conventional error detecting unit of the motor rotation control device.

A method for judging the agreement of respective directions of rotation after the appointed period of time $\Delta T$ (the period of time (g) through (h)) from the time of changing the rotation commanded direction of the motor when changing the direction of rotation of the motor from the CCW direction to the CW direction as shown in FIG. 6 to the time at which the appointed direction of rotation of the motor becomes coincident with the actual direction of the motor elapses is, for instance, listed as one of the examples of the aforementioned error detecting methods.

In the conventional method, however, it is necessary to wait for judgement of the error until the actual direction of rotation of the motor coincides with the rotation commanded direction after having changed the rotation commanded direction of the motor. So, the method has a fault that any error of the motor rotation control device can not be detected in the meantime.

SUMMARY OF THE INVENTION

The present invention has been made to overcome the aforementioned points of problems in the prior art.

It is therefore an object of the invention to provide an error detecting unit of a motor rotation control device by which any error of the corresponding motor rotation control device can be instantaneously detected even right after the rotation commanded direction of the motor is changed and reverse drive force is given thereto.

Namely, the invention provides an error detecting unit of a motor rotation control device furnished with a rotational detector for detecting the rotation of the motor and actual rotation direction detecting means for obtaining the actual direction of rotation of the corresponding motor on the basis of the rotation detection signals of the corresponding rotational detector and so composed that reverse drive force can be given to the corresponding motor by changing a commanding signal for appointing the direction of rotation of the corresponding motor when changing the direction of rotation of the corresponding motor or braking the motor, being characterized in that the corresponding motor rotation control device can be judged to be out of order in the case that the actual direction of rotation of the motor does not coincide with the rotation commanded direction of the commanding signal and the rotation speed of the corresponding motor obtained on the basis of the rotation detection signal of the rotational detector is not decelerated.

As an error detecting unit of the motor rotation control device is so constructed as aforementioned, it can be judged that the corresponding motor rotation control device is out of order in the case that the actual direction of rotation of the motor obtained by the actual rotation direction detecting means is not coincident with the rotation commanded direction of the commanding signal and the rotation speed of the motor obtained on the basis of the rotation detection signal of the rotational detector is not decelerated.

Therefore, such an error of the corresponding motor rotation control device (for instance, breakage of wire or short circuit of the rotary detector, and a defect of drive transistor, etc.) as that the motor speed is not decelerated in spite of having given reverse drive force to the motor by changing the rotation commanded direction of the commanding signal can be instantaneously detected without elapse of the period of time ΔT after having changed the direction of rotation.

This specification hereof clearly points out the subject of the invention and ends with the claims clearly claimed hereafter. The ensuing description with reference to the drawings accompanied herewith is helpful to a better understanding.

DETAILED DESCRIPTION OF THE PREFERRED EMBODIMENTS

Figure 1:
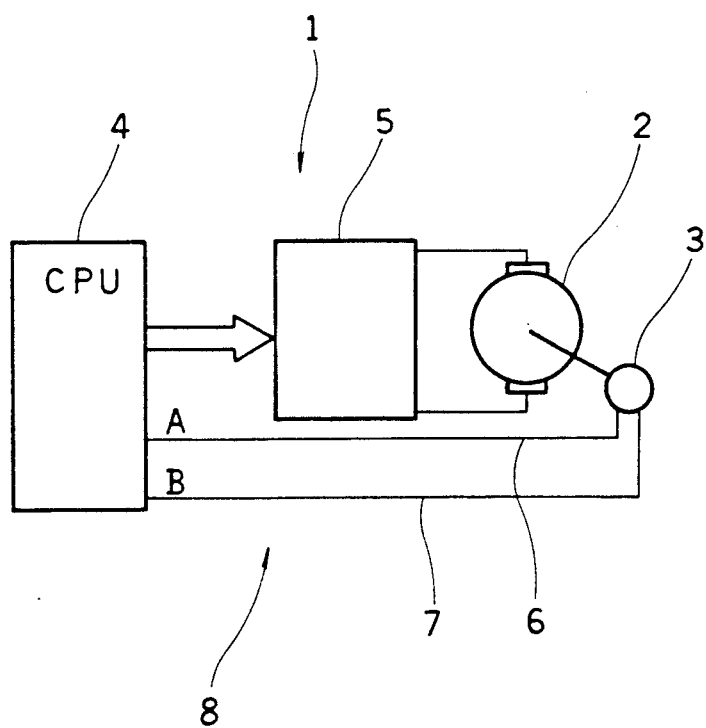
FIG. 1 is a block diagram showing an error detecting unit of the motor rotation control device pertaining to one of the preferred embodiments of the invention.

As shown in FIG. 1, the motor rotation control device 1 is provided with a rotational detector 3 consisting of an encoder, etc. attached to the motor 2.

The rotational detector 3 outputs two kinds of rotation detecting signals (A, B) having a phase difference, for instance, 90 degrees and equal frequency according to the rotation of the motor 2.

The motor rotation control device 1 is composed of a control section 4 consisting of a micro computer CPU (central processing unit), etc., a motor drive control circuit 5 for driving and controlling the motor 2 and output lines 6 and 7 for transmitting the rotation detection signals A ($\phi$A) and B ($\phi$B) of the rotational detector 3 are connected to the control section 4.

Figure 4:
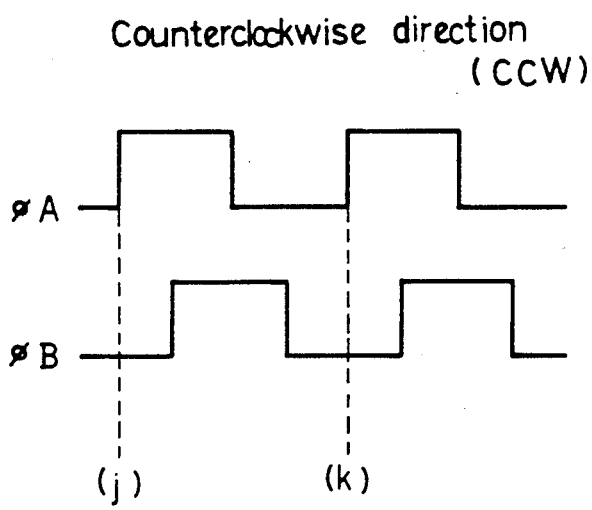
FIG. 4 is a time chart showing the rotation detection signals A and B of the rotational detector when the motor controlled by the motor rotation control device rotates in the CCW direction.
Figure 5:
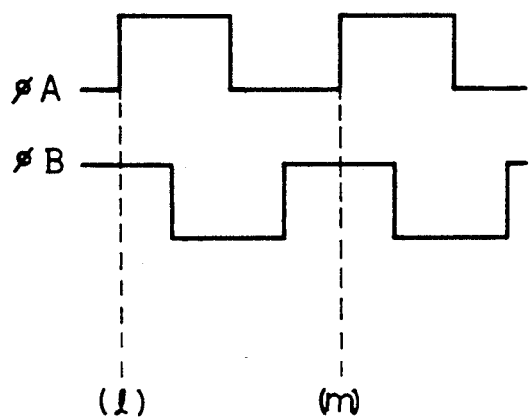
FIG. 5 is a time chart showing the rotation detection signals A and B of the rotational detector when the motor rotates in the CW direction.

As the motor 2 rotates in the CCW direction or the CW direction, the rotation detection signals A and B as shown in the time charts of FIG. 4 and FIG. 5 are inputted in the control section 4 through the output lines 6 and 7, respectively.

The motor rotation control device 1 outputs the commanding signal for appointing the direction of rotation of the motor 2 to rotate the motor 2, thereby causing the motor 2 to be driven and controlled, obtaining the actual direction (CCW direction or CW direction) of rotation of the motor 2 according to the difference of the level (low or high level) of the rotation detection signal B at the upstroke (shown at the time (j), (k) in FIG. 4 and at the time (l), (m) in FIG. 5 and hereinafter called "upstroke edge") from the low level to the high level of the rotation detection signal A.

Means for realizing a function of obtaining the actual direction of rotation of the motor 2 is an example of the actual rotation direction detecting means.

The motor rotation control device 1 changes the commanding signal on changing the direction of rotation of the motor 2 or braking the motor, thereby causing reverse drive force to be given to the motor 2.

Figure 6:
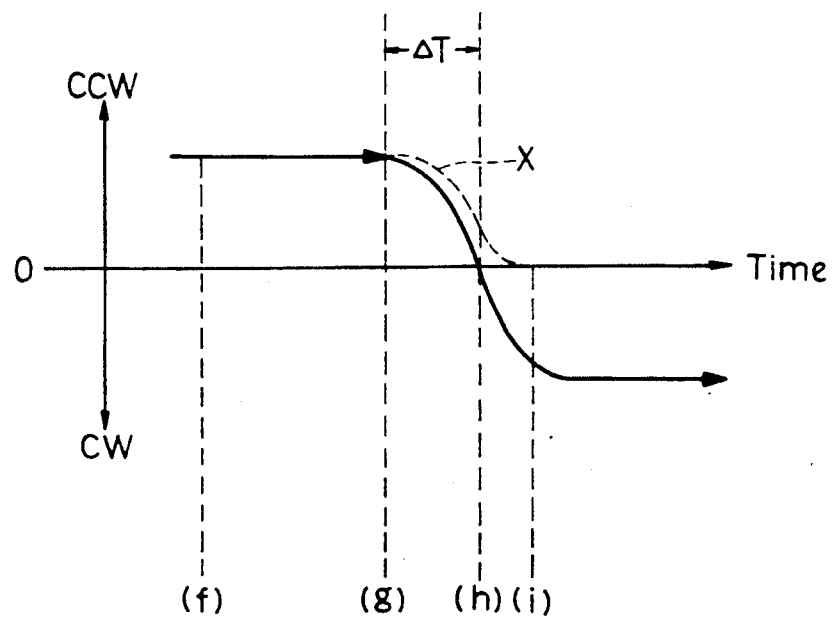
FIG. 6 is a time chart showing the rotation speed changes of the motor when changing the direction of rotation of the motor rotation control device and braking the motor.

Therefore, as explained in FIG. 6, the actual direction of rotation of the motor 2 becomes opposite to the rotation commanded direction, respectively, in the period (ΔT) of time (g) through (h) on changing the direction of rotation of the motor 2 and in the period of time (g) through (i) on braking the motor 2.

The basic construction of the error detecting unit 8 of this motor rotation control device 1 is almost the same as that of the above motor rotation control device 1.

However, the construction of the above error detecting unit 8 is different from that of the motor rotation control device 1 in such a point that the error detecting processing as shown below can be carried out.

Figure 2:
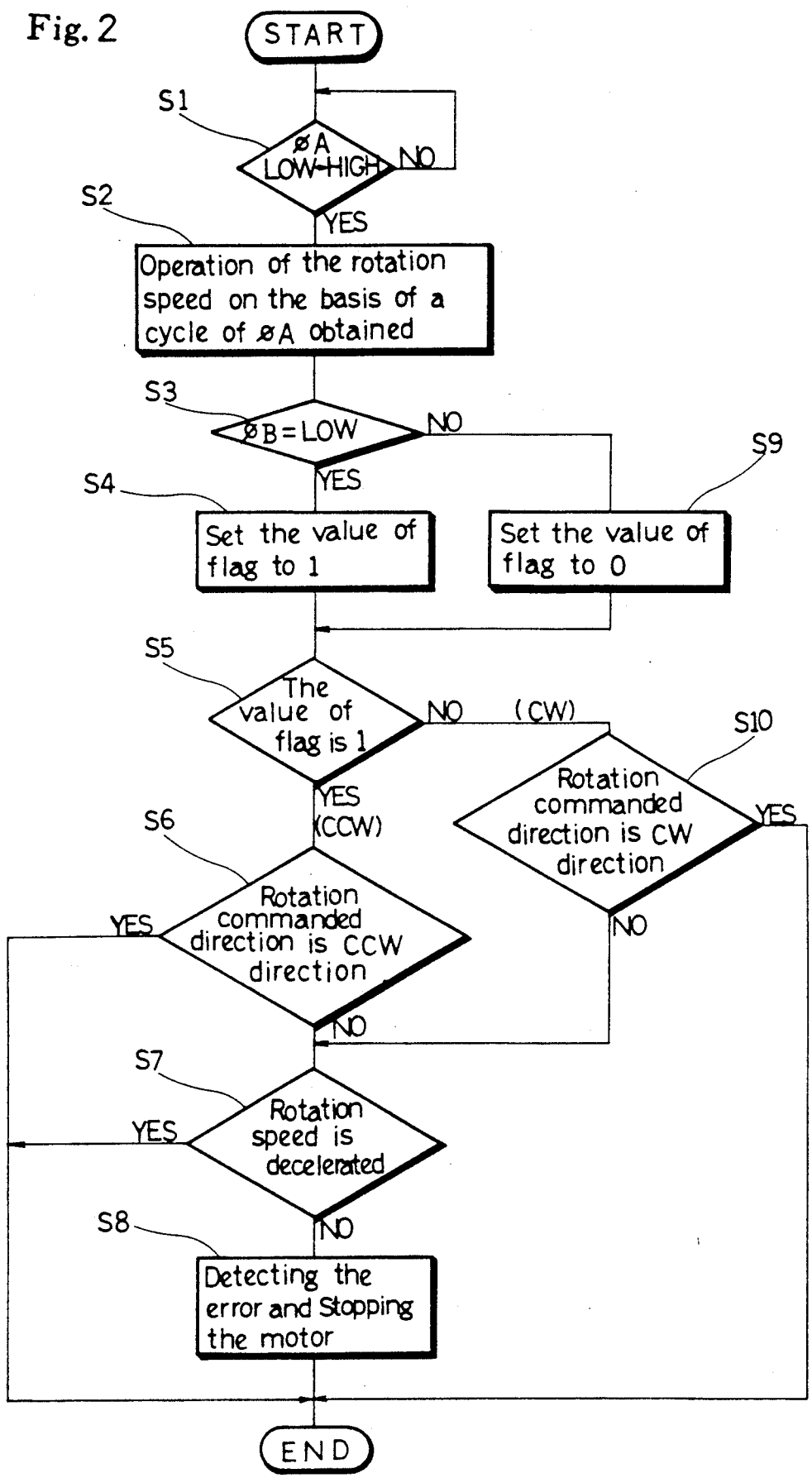
FIG. 2 is a flow chart showing an example of the error detection processing of the error detecting unit.
Figure 3:
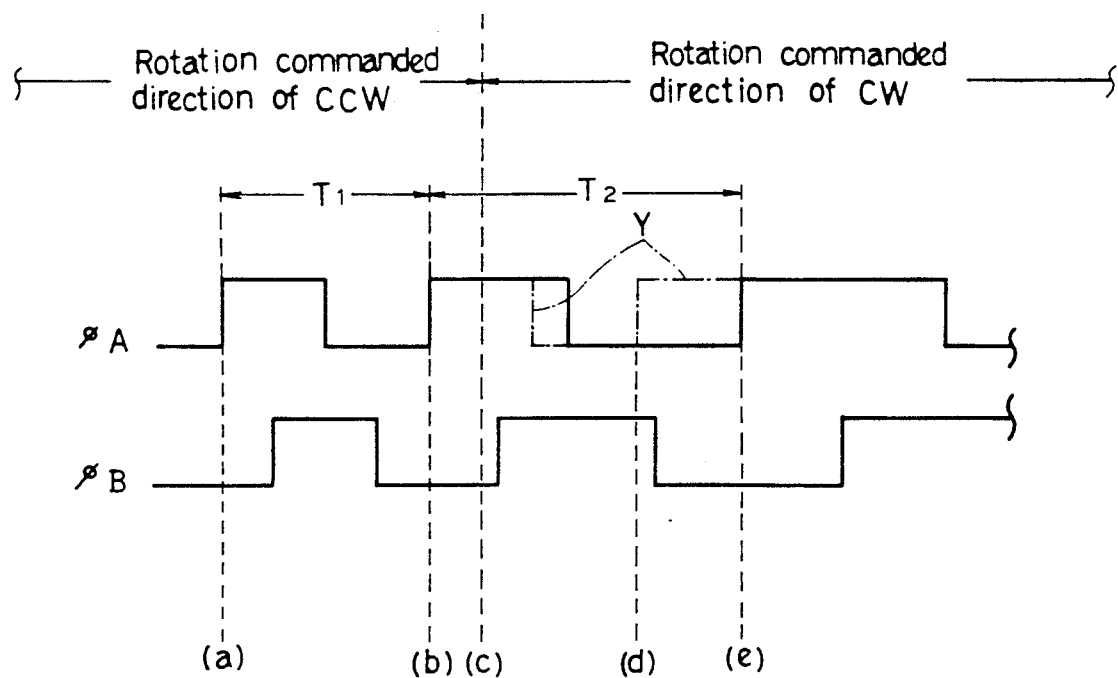
FIG. 3 is a time chart showing an example of the rotation detection signals of the rotational detector of the error detecting unit.

Hereupon, with reference to the flow chart of FIG. 2, and the time charts of FIG. 3 and FIG. 6, the error detecting processing of the error detecting unit 8 of the motor rotation control device 1 is explained in the order of the steps S1, S2, . . . Also, the details of the above error detecting processing procedure is pre-stored as program in a memory (not illustrated) in the control section 4.

For example, supposing that the motor 2 rotates in the CCW direction by outputting the rotation commanding signals of the CCW direction from the control section 4 (the period of time (f) through (g) in FIG. 6), the upstroke edge of the rotation detection signal A is detected, for instance, at the time (b) in FIG. 3 (Step S1).

And the period of time (T1), that is, a cycle of the rotational detection signal A, between the upstroke edge (the time (a) in FIG. 3) of the rotation detection signal A detected at the last time and the upstroke edge (the time (b)) detected in the above is obtained, thereby causing the rotation speed of the motor 2 to be operated (Step S2).

Means for realizing a function for obtaining the rotation speed of the motor 2 on the basis of the rotation detection signal A of the aforementioned rotational detector 3 is an example of the rotation speed operation means.

It is then judged in the step S3 whether or not the level of the rotation detection signal B in having detected the upstroke edge of the aforementioned rotation detection signal A is low, and the actual direction of rotation of the motor 2 can be obtained according to the results of this judgement.

Namely, in this case, as the level of the rotation detection signal B is low (Step S3), a flag in the aforementioned CPU is set to 1 as the value (Step S4).

Then, it is judged whether or not the above flag is 1 (Step S5). In this case, as the flag is 1, it is then judged that the actual direction of rotation of the motor 2 is CCW direction, and the program goes to the next step. That is, a program provided as means for realizing a function of the steps S3 through S5 and S9 is the actual rotation direction detecting means.

Furthermore, it is then judged in the step S6 whether or not the actual direction of rotation of the motor 2 detected in the above is coincident with the rotation commanded direction of the motor 2 by a commanding signal.

Namely, as the actual direction of rotation and the rotation commanded direction by the above commanding signal are the CCW direction and agreed with each other (Step S6), it is judged that the motor rotation control device 1 is normal, and the rotation of the motor 2 is continued as it is.

Here, in the case that the rotation commanded direction of the motor 2 by the commanding signal is for instance changed from the CCW direction to the CW direction (the time (g) in FIG. 6, and the time (c) in FIG. 3), the upstroke edge of the rotation detection signal A is detected as well as in the above description (Step S1) (the time (e) in FIG. 3), and the period of time (T2) between the upstroke edge (the time (b)) of the rotation detection signal A detected in the above and the upstroke edge (the time (e)) detected here is obtained, thereby causing the rotation speed of the motor 2 to be operated (Step S2) (The rotation speed operation means).

And the processing in the steps S3 and S4 is performed as well as in the above description, thereby causing the actual direction (CCW direction) of rotation of the motor 2 to be obtained (Step S5). At this time, as the above rotation commanded direction is CW direction, the above actual direction of rotation (CCW direction) is not agreed with the rotation commanded direction (CW direction) (Step S6). Hence, the processing goes to the next step, wherein it is judged in the step S7 whether or not the rotation speed of the motor 2 is decelerated.

At this time, as shown in FIG. 3, as the motor 2 is given reverse drive force by changing the rotation commanded direction with the above commanding signal and the motor 2 is speed-decelerated thereby causing the above period of time T1 to be shorter than the period of time T2 (i.e., T1<T2) (Step S7), it is confirmed that the rotation speed of the motor 2 is lowered. It is thereby judged that the motor rotation control device 1 is NORMAL], and furthermore, the rotation of the motor 2 is continued.

Actually however, unless the rotation speed of the motor 2 is lowered in spite of having changed the rotation commanded direction with the above commanding signal, that is, for instance the period of time T2 is the period of time (b) through (d) as shown with a dashed line Y and the period of time T1 is equal to or larger than the period of time T2 (i.e., T1≧T2) (Step S7). it is judged that this motor rotation control device 1 is out of order. And the control section 4 forcedly stops the motor 2 through the motor drive control circuit 5 (Step S8).

Therefore, the error detecting unit 8 of this motor rotation control device 1 can detect the error such as, for instance, breakage of wire, short circuit of the rotational detector 3, a defect of a transistor of the motor drive control circuit 5, etc. of the motor rotation control device 1 even right after the rotation commanded direction by the commanding signal of the rotation of the motor 2 has been changed from the CCW direction to the CW direction (for instance the time (d)).

Namely, means for realizing a function for judging that the motor rotation control device 1 is out of order if the above motor 2 does not agreed with the rotation commanded direction (the CW direction) of the commanding signal and the rotation speed of the motor 2 is not lowered (the period of time T1≧the period of time T2) is an example of the error judging means.

Also, the steps S9 and S10 show the processing when the actual direction of rotation of the motor 2 is the CW direction. The steps S5, S7 and S8 in this case are completely the same as in the processing when the above actual direction of rotation of the motor 2 is the CCW direction. Therefore, the explanation on these steps are omitted herein.

According to the error detecting unit of the motor rotation control device pertaining to the preferred embodiment of the invention, any error of the motor rotation control device can be instantaneously detected, without waiting until the above actual direction of rotation of the motor becomes coincident with the rotation commanded direction after changeover, even right after the rotation commanded direction of motor by a commanding signal has been changed and reverse drive force is given to the motor.

The present invention can be embodied or effected in other construction without departing from the spirit and substantial features thereof.

Therefore, the above embodiment is one of the preferred embodiments but is not limited to the above embodiment, and it will be apparent to those skilled in the art that various changes and modifications may be made therein without departing from the spirit and scope of the claims of the present invention as claimed.

What is claimed is:

1. An error detecting unit of a motor rotation control device furnished with a rotational detector for detecting the rotation of the motor and the actual rotation direction detecting means for obtaining the actual direction of rotation of the corresponding motor on the basis of the rotation detection signals of the corresponding rotational detector and so composed that reverse drive force can be given to the corresponding motor by changing a command signal for appointing the direction of rotation of the corresponding motor when changing the direction of rotation of the corresponding motor or braking the motor, being characterized by comprising:

a computing means comprising:

rotational speed operation means for obtaining the rotational speed of the motor on the basis of the rotation detection signal of the rotation detector; and error judging means for judging that a corresponding motor rotation control device is out of order in the case that the actual direction of rotation of the motor does not coincide with a rotation commanded direction of the commanding signal by commanding the rotational direction to change and determining if the rotation speed of the corresponding motor obtained on the basis of the rotation detection signal of the rotational detector is not decelerated;

whereby if the rotation speed does not decelerate, the actual direction of rotation does not coincide with the rotation commanded direction.

2. An error detection unit according to claim 1, wherein said rotational detector comprises a pulse encoder coupled to said motor.

* * * * *